(12) United States Patent
Lev et al.

(10) Patent No.: US 7,142,516 B2
(45) Date of Patent: Nov. 28, 2006

(54) PERFORMANCE MONITORING OF HIGH SPEED COMMUNICATIONS NETWORKS

(75) Inventors: Kobi Lev, Ramat Gan (IL); Ophir Fuchs, Rishon lezion (IL)

(73) Assignee: Corrigent Systems Ltd, Tel Aviv (IL)

( * ) Notice: Subject to any disclaimer, the term of this patent is extended or adjusted under 35 U.S.C. 154(b) by 1046 days.

(21) Appl. No.: 10/128,459

(22) Filed: Apr. 24, 2002

(65) Prior Publication Data

US 2003/0204595 A1     Oct. 30, 2003

(51) Int. Cl.
*G06F 11/00* (2006.01)

(52) U.S. Cl. .................... 370/244; 370/252

(58) Field of Classification Search ........... 370/244, 370/252
See application file for complete search history.

(56) References Cited

U.S. PATENT DOCUMENTS

| | | | | |
|---|---|---|---|---|
| 5,375,070 | A | * | 12/1994 | Hershey et al. ............. 709/224 |
| 5,768,255 | A | * | 6/1998 | Brownmiller et al. ...... 370/248 |
| 5,878,032 | A | | 3/1999 | Mirek et al. |
| 6,058,102 | A | | 5/2000 | Drysdale et al. |
| 6,067,288 | A | | 5/2000 | Miller et al. |
| 6,097,702 | A | | 8/2000 | Miller et al. |
| 6,216,207 | B1 | | 4/2001 | Miller et al. |
| 6,282,173 | B1 | | 8/2001 | Isonuma et al. |
| 6,438,603 | B1 | | 8/2002 | Ogus |
| 6,868,094 | B1 | | 3/2005 | Bordonaro et al. |
| 2001/0046074 | A1 | | 11/2001 | Kakizaki et al. |

OTHER PUBLICATIONS

H. Schultzrinne; RTP: A Transport Protocol for Real-Time Applications; Jan. 1996; IETF, RFC 1880; 66 pages.
Abstract of *Synchronous Optical Network (SONET) Transport Systems: Common Generic Criteria*, Telecordia Technologies, Publication No. GR-253-CORE, New Jersey, Sep. 2000, 2 pages.

* cited by examiner

*Primary Examiner*—Hassan Kizou
*Assistant Examiner*—Anthony Sol
(74) *Attorney, Agent, or Firm*—Sterne, Kessler, Goldstein & Fox P.L.L.C.

(57) ABSTRACT

A performance monitoring system for a digital network is installed in network elements having performance monitoring responsibilities. Apparatus is provided for network elements, in which a bitmap representation of performance primitives detected during an acquisition interval is used as a control in the tracking and updating of network performance parameters. Immediate access to states that enable and inhibit the evaluation of individual performance parameters is available.

47 Claims, 7 Drawing Sheets

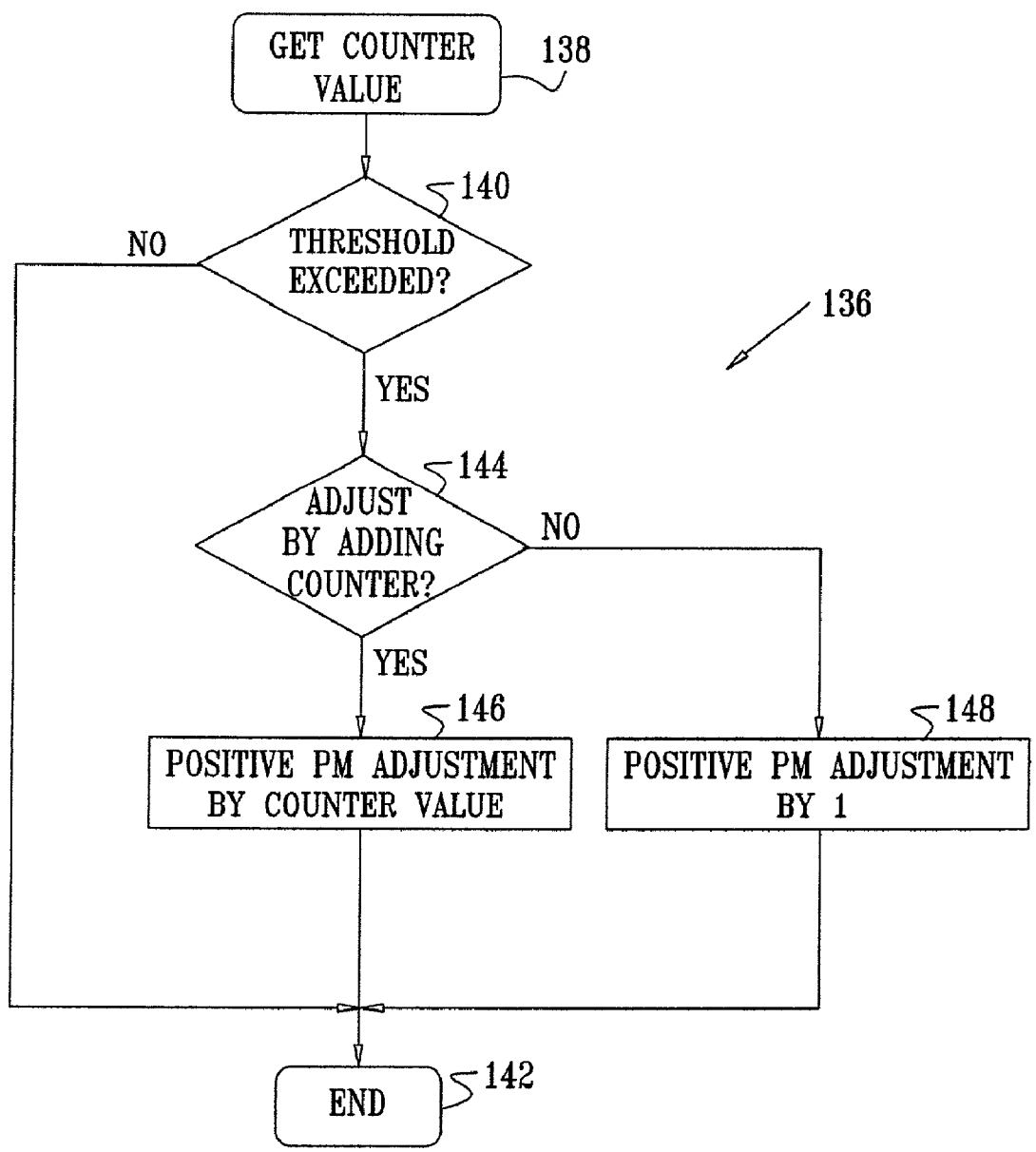

PERFORMANCE MONITORING OF HIGH SPEED COMMUNICATIONS NETWORKS

BACKGROUND OF THE INVENTION

1. Field of the Invention

This invention relates generally to communication networks. More specifically, this invention relates to performance monitoring in high-speed packet networks.

2. Description of the Related Art

A number of acronyms well known in the art are used herein. For convenience, they are summarized in Table 1.

TABLE 1

| ACRONYM | Meaning |
|---|---|
| AIS | alarm indication signal |
| APS | automatic protection switching |
| BER | bit error rate |
| BIP | bit interleaved parity |
| CV | code violation |
| DS-N | digital signal at level N |
| ES | errored seconds |
| ES-LFE | far end line errored second |
| ES-S | Section Errored Second |
| LOF | loss of framing |
| LOS | loss of signal |
| OC-N | optical carrier level at level N |
| OS | operations system |
| PDH | plesiochronous digital hierarchy |
| POH | payload overhead |
| RDI | remote defect indication |
| REI | remote error indication |
| SDH | synchronous digital hierarchy |
| SEF | severely eroded framing |
| SEF | severely errored framing |
| SES | severely errored second |
| SONET | synchronous optical network |
| SPE | synchronous payload envelope |
| STM | signaling traffic management |
| STS-N | synchronous transport signals at level N |
| TDM | time division multiplexed |
| TOH | transport overhead |
| UAS | unavailable seconds. A count of the seconds during which a layer was considered to be unavailable. |
| VT | virtual tributary |
| VTG | virtual tributary group |

High-speed communications networks continue to increase in importance in modern telecommunications. As an example, the Synchronous Optical Network (SONET) is a set of standards that define a hierarchical set of transmission rates and transmission formats for carrying high-speed, time-domain-multiplexed (TDM) digital signals. SONET lines commonly serve as trunks for carrying traffic between circuits of the plesiochronous digital hierarchy (PDH) used in circuit-switched communication networks. SONET standards of relevance to the present patent application are described, for example, in the document *Synchronous Optical Network (SONET) Transport Systems: Common Generic Criteria* (Telcordia Technologies, Piscataway, N.J., publication GR-253-CORE, September, 2000). While the SONET standards have been adopted in North America, a parallel set of standards, known as Synchronous Digital Hierarchy (SDH), has been promulgated by the International Telecommunications Union (ITU), and is widely used in Europe. From the point of view of the present invention, these alternative standards are functionally interchangeable.

There are four optical interface layers in SONET: path layer, line layer, section layer and photonic layer. These optical interface layers have a hierarchical relationship, with each layer building on the services provided by the lower layers. Each layer communicates with peer equipment in the same layer and processes information and passes it up and down to the next layer by mapping the information into a differently organized format and by adding overhead. In a simplified example, network nodes exchange information as digital signals (DS1 signals) having a relatively small payload. At a source node of the path layer several DS1 signals are packaged to form a synchronous payload envelope (SPE) composed of synchronous transport signals (STS) at level 1 (STS-1), along with added path overhead. The SPE is handed over to the line layer. The line layer concatenates multiple SPEs, and adds line overhead. This combination is then passed to the section layer. The section layer performs framing, scrambling, and addition of section overhead to form STS-Nc modules. Finally the photonic layer converts the electrical STS-Nc modules to optical signal and transmits them to a distant peer node as optical carriers (OC-N signals).

At the distant peer node, the process is reversed. First, at the photonic layer the optical signal is converted to an electrical signal, which is progressively handed over to lower levels, stripping off respective overheads, until the path layer is reached. The DS1 signals are unpackaged, and terminate at the destination node.

The lowest-rate link in the SONET hierarchy is the optical carrier level (OC-1) at the path layer, which is capable of carrying 8000 STS-1 frames per second, at a line rate of 51.840 Mbps. An STS-1 frame contains 810 bytes of data, which are conventionally organized as a block of nine rows by 90 columns. The first three columns hold transport overhead (TOH) while the remaining 87 columns carry the information payload, referred to as the synchronous payload envelope (SPE). The SPE contains one column of payload overhead (POH) information, followed by 86 columns of user data. The POH can begin at any byte position within the SPE capacity of the payload portion of the STS-1 frame. As a result, the SPE typically overlaps from one frame to the next. The TOH of each frame contains three pointer bytes (H1, H2, H3), which are used to indicate where in each frame the POH begins and to compensate for timing variations between the user input lines and the SONET line on which the STS-1 frames are transmitted.

STS-1 frames can efficiently transport DS-3 level signals, operating at 44.736 Mbps. The STS-1 frames themselves are not too much larger than DS-3 frames. When signals at rates below DS-3 are to be carried over SONET, the SPE of the STS-1 frame is divided into sections, known as virtual tributaries (VTs), each carrying its own sub-rate payload. The component low-rate signals are mapped to respective VTs, so that each STS-1 frame can aggregate sub-rate payloads from multiple low-rate links. Multiple STS-1 frames can be multiplexed (together with STS-Nc frames) into STS-N frames, for transmission on OC-N links at rates that are multiples of the basic 51.840 Mbps STS-1 rate.

For the purpose of VT mapping, each STS-1 frame is divided into seven virtual tributary groups (VTGs), each occupying 12 columns of the SPE. Within each VTG, four VT sizes are possible:

The size VT1.5 occupies three columns, each with sufficient bandwidth to transport a DS-1 signal at 1.544 Mbps (i.e., the signal carried on a T-1 line). One VTG can contain four VT1.5 sections.

The size VT2 occupies four columns, providing bandwidth sufficient for an E-1 line.

The size VT3 occupies six columns, providing bandwidth sufficient for a DS-1C signal.

The size VT6 occupies twelve columns, providing bandwidth sufficient for a DS-2 signal.

Mapping of the VTs to the columns of the SPE is specified in detail in the above-noted Telcordia publication GR-253-CORE, at section 3.2.4. It is not necessary that all of the VTs in an STS-1 frame be used to carry lower-rate signals. Unequipped VT sections, i.e., sections that have no service to carry in the SPE, are simply filled with default data. These unequipped sections are assigned a special indication in the VT POH byte V5, bits 5 to 7, known as the signal label. In SDH systems, STM-1 frames are similarly divided into sub-rate payload sections of different sizes, referred to as TU-11, TU-12 and TU-2.

Maintenance criteria are extensively specified in the above-noted Telcordia publication GR-253-CORE to enable the maintenance of the integrity of the network and individual network elements. Maintenance includes the general undertakings of (1) defect detection and the declaration of failures, (2) verification of the continued existence of a problem, (3) sectionalization of a verified problem, (4) isolation, and (5) restoration.

Performance monitoring, to which this application particularly relates, is important and sometimes essential to the conduct of the various above-mentioned tasks in network maintenance. Performance monitoring, as used herein, relates to the in-service, non-intrusive monitoring of transmission quality. Network elements are required to support performance monitoring as appropriate to the functions provided at their respective levels in the network. In large part, performance data is accumulated from information carried in overhead bits. The photonic layer is an exception. There, specified physical parameters are monitored. Network elements are also required to perform self inventory, by which a network element reports information to the performance monitor about its own equipment, as well as adjacency information concerning other network elements to which it is physically or logically connected. The above-noted Telcordia publication GR-253-CORE contains generic performance monitor strategies, discusses various types of performance monitor registers (e.g., current period, previous period, recent period and threshold registers), and defines performance monitor parameters for the various signals which are found in SONET communication.

A principal approach taken in SONET performance monitoring is the accumulation by network elements of various performance monitor parameters based on performance "primitives" that it detects in the incoming digital bit stream. Primitives can be either anomalies or defects. An anomaly is defined to be a discrepancy between the actual and desired characteristics of an item. A defect is defined to be a limited interruption in the ability of an item to perform a required function. The persistence of a defect results in a failure, which is defined to be the termination of the ability of an item to perform a required function. A large number of defects and failures are defined in the above-noted Telcordia publication GR-253-CORE.

Functionally, performance monitoring is performed at each layer, independent of the other layers. However, part of the functional model assumes that layers pass maintenance signals to higher layers. For example, a defect, such as Loss of Signal (LOS) that occurring at the section layer causes an alarm indication signal (AIS-L) to be passed to the line layer, which in turn causes an alarm signal (AIS-P) to be transmitted to the STS Path layer. Thus, an AIS defect can be detected at a particular layer either by receiving the appropriate AIS on the incoming signal, or by receiving it from a lower layer. In consequence, performance monitor parameters at a level are influenced by defects and failures occurring at other levels.

Thresholds are defined for most of the performance monitor parameters supported by SONET network elements. These are used by the performance monitor to detect when transmission degradations have reached unacceptable levels. It is common for hysteresis to be employed before a declared defect or failure can be terminated, in order to assure stability of the system.

Accumulation intervals are defined for each performance monitor parameter. Data accumulated in successive accumulation intervals are required to be independently maintained in a memory as a pushdown stack during a current day's operation. Each network element reports its statuses and results periodically to a higher authority or performance monitor management system. It is the responsibility of the performance monitor management system to derive time-based calculations such as the time during which an defect or failure persisted (errored seconds) and other performance monitor related parameters. Each of the parameters that have to be calculated is depend on one or more variables related to SONET defects, SONET counters, and SONET failures.

For example, Severely eroded seconds at the line level are monitored using the performance monitor parameter SES-L. This parameter is advanced if any of the following SONET defects was active during the previous second: severely eroded framing (SEF), loss of signal (LOS), and alarm indication signal (AIS-L).

As a second example, the counter CV-L counts coding violations at the line level. The performance monitor parameter SES-L is advanced if the SONET counter CV-L is above 9834.

Conventional performance monitor management implementations employ a separate state machine for the monitoring of each performance monitor parameter. An advantage of the state machine approach is the possibility of an "undo" operation, or rollback to a previous state. However, due to the large numbers of performance monitor parameters, and their interrelationships, the state machines are complex, and difficult to maintain and debug. In conventional performance monitor management systems rollback has been accomplished in two ways. In a first approach, it is possible to maintain a previous state for a period of time. During this the system can discard new state data and roll back to the previous state. Maintaining large number of states involves complex software, large amounts of memory storage, and implies slow performance.

A second approach to performance monitor management provides inverse operations. For example, for each increment function, a decrement function can be provided. Using inverse operations requires the propagation of data through the network, under various conditions of operational impairment, and possibly to computer systems outside the network. Considerable system coordination among various network elements and external systems again implies a high degree of design complexity and expense in program maintenance and administration.

U.S. Pat. No. 6,097,702 to Miller et al. discloses an implementation of a performance monitor management system using a library of event-responsive code modules which are installed in various telecommunication equipment as components of event-responsive performance monitoring software. While the use of such modules may mitigate the load on designers of a performance monitor management system, there still remains a need for a more efficient, simpler implementation of a performance monitor management system in a SONET network.

SUMMARY OF THE INVENTION

It is therefore a primary object of some aspects of the present invention to improve the performance management of digital communication networks.

It is a further object of some aspects of the present invention to provide an improved method and apparatus for monitoring the performance of digital networks.

It is yet another object of some aspects of the present invention to improve the performance management of optical networks.

These and other objects of the present invention are attained by a performance monitoring system applicable to network elements having performance monitoring responsibilities in a digital network. Apparatus is provided for individual network elements, in which a bitmap representation of performance primitives detected during an acquisition interval act as a control in the tracking and updating of network performance parameters. An important advantage of the bitmap representation is simplification of program maintenance and development as performance monitoring of digital transmission networks evolves, new performance parameters are instituted, and old ones redefined. The bitmap representation also enhances the efficiency of performance management by providing immediate access to states that enable and inhibit the evaluation of individual performance parameters.

The monitoring system is realized as a single state machine in each network element, which performs the performance management tasks in an efficient manner, for example, maintenance tasks such as the addition and deletion of performance parameters.

The invention provides a method of monitoring performance of a communications network, including the steps of associating a performance parameter with a set of events in the communications network, and defining a map in a memory, wherein the map includes a plurality of concatenated elements. Each of the concatenated elements is independently capable of a transition between a first binary state and a second binary state, and each of the concatenated elements corresponds to a member of the set of the events. The communications network is monitored for an acquisition interval by detecting a signal in a data stream of the communications network that represents an occurrence of one of the events during the acquisition interval, and thereafter flagging one of the concatenated elements of the map that corresponds to event. Then the performance parameter is calculated in accordance with the state of the map.

According to an aspect of the method, the communications network is a SONET network.

According to yet another aspect of the method, the communications network is an SDH network.

In an additional aspect of the method, the map includes a plurality of maps. The method further includes associating members of a first subset of the set with the concatenated elements of a first map of the plurality of maps, and associating members of a second subset of the set with the concatenated elements of a second map of the plurality of maps. The performance parameter is calculated if at least one of the concatenated elements of the first map is flagged.

In a further aspect of the method, the performance parameter is calculated if none of the concatenated elements of the second map is flagged.

According to yet another aspect of the method, the map is a bitmap.

In a further aspect of the method, the performance parameter is adjusted for a portion of the acquisition interval, during which the data stream was determined to be unavailable.

The invention provides a method of monitoring performance of an optical communications network, including the steps of associating a performance parameter with a set including defects and failures capable of occurring in the optical communications network, defining a map in a memory, wherein the map includes a plurality of concatenated elements. Each of the concatenated elements is independently capable of a transition between a first binary state and a second binary state. Each of the concatenated elements corresponds to a member of the set. The method further includes monitoring the optical communications network for an acquisition interval, by detecting information in a frame that is transmitted in a data stream of the optical communications network that represents an occurrence of one of the defects and failures during the acquisition interval. Thereafter one of the concatenated elements of the map that corresponds to the one of the defects and failures is flagged. Then, the performance parameter is calculated in accordance with the state of the map.

In an aspect of the method the map is defined by defining an OR-defects bitmap and associating elements thereof with first members of the set, wherein the first members are defects, defining a NOT-defects bitmap and associating elements thereof with second members of the set, wherein the second members are defects, defining an OR-failures bitmap and associating elements thereof with third members of the set, wherein the third members are failures, and defining a NOT-failures bitmap and associating elements thereof with fourth members of the set, wherein the fourth members are failures. Flagging is accomplished by creating a transition between the first binary state the second binary state in one of the concatenated elements of one of the OR-defects bitmap, the NOT-defects bitmap, the OR-failures bitmap and the NOT-failures bitmap.

In another aspect of the method, the performance parameter is adjusted for a portion of the acquisition interval during which the data stream was determined to be unavailable.

The invention provides an apparatus for monitoring performance of a communications network, including a memory that has a map defined therein, wherein the map includes a plurality of concatenated elements. Each of the concatenated elements is independently capable of a transition between a first binary state and a second binary state. The apparatus includes a processor that accesses the memory and is connected to a network element of the communications network. Program instructions stored in the processor cause the processor to perform the steps of associating a performance parameter with a set of events in the communications network, wherein each of the concatenated elements of the map corresponds to a member of the set of the events, monitoring the communications network for an acquisition interval by detecting a signal in a data stream of the communications network that represents an occurrence of one of the events during the acquisition interval, flagging in one of the concatenated elements an indication that the occurrence has been detected, and thereafter calculating the performance parameter in accordance with the state of the map. The communications network can be an optical communications network.

The invention provides a computer software product, including a computer-readable medium in which computer program instructions are stored, which instructions, when read by a computer, cause the computer to monitor performance of a communications network by associating a performance parameter with a set of events in the communications network, monitoring the communications network for an acquisition interval, detecting a signal in a data stream of the communications network that represents an occurrence of a member of the set of the events during the acquisition interval, flagging in a bitmap an indication that the occurrence has been detected, and thereupon calculating the performance parameter in accordance with the state of the bitmap.

In an aspect of the computer software product, the instructions cause the computer to flag the indication by associating each the member of the set of the events with an element of the bitmap. The communications network can be an optical communications network.

BRIEF DESCRIPTION OF THE DRAWINGS

For a better understanding of these and other objects of the present invention, reference is made to the detailed description of the invention, by way of example, which is to be read in conjunction with the following drawings, wherein:

FIG. 8 is a detailed flow chart illustrating the evaluation of the counters in the method shown in FIG. 7.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client/server environment, such software programming code may be stored on a client or a server, or on various network elements. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and distributing software code via networks are well known and will not be further discussed herein.

The preferred embodiment of the invention is presented with reference to a SONET/SDH network. However the teachings of the invention are not limited to such a network, but are broadly applicable to other communications network protocols in which performance monitoring occurs.

System Architecture.

Figure 1:
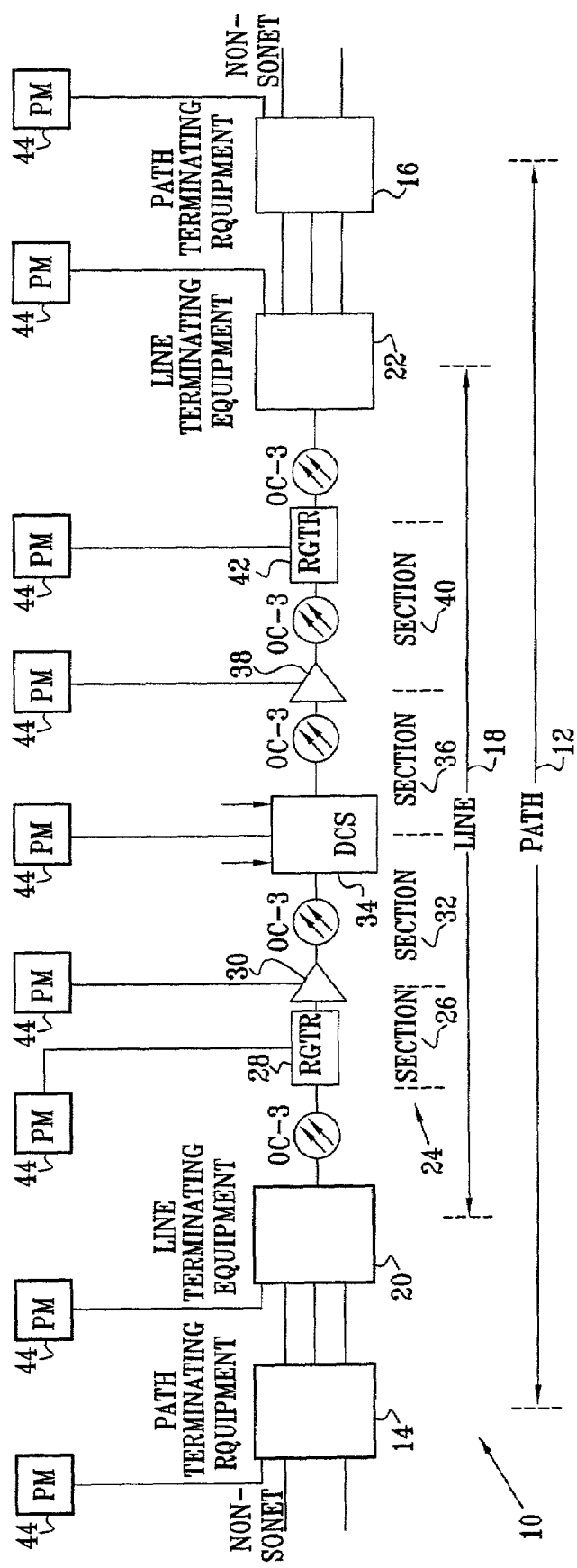
FIG. 1 is a block diagram illustrating an end-to-end connection in a SONET network which is constructed and operative in accordance with a preferred embodiment of the invention.

Turning now to the drawings, reference is made to FIG. 1, which is a high level diagram of an end-to-end connection in a SONET network, which is constructed and operative in accordance with a preferred embodiment of the invention. An optical network 10 of SONET network elements is shown. At a path level 12. The terminal SONET portions of the optical network 10 are represented by STS path terminating equipment 14, 16, which can multiplex and demultiplex an STS payload, and interface with non-SONET elements. The path terminating equipment 14, 16 communicates with a line layer 18, consisting of line terminating equipment 20, 22. The line terminating equipment 20, 22 originates and terminates line signals, and relates to a section layer 24. In some embodiments, the optical network 10 may be an SDH network.

The section layer 24 is defined by adjacent SONET network elements, which can be a terminating network elements, various cross-connects, add-drop multiplexers, or regenerators. These network elements can originate, modify or terminate section overhead, or can perform any combination of these actions. A section 26 is defined by a regenerator 28 and section terminating equipment 30. A section 32 is defined by the section terminating equipment 30 and a digital cross-connect 34. A section 36 is defined by the digital cross-connect 34 and section terminating equipment 38. A section 40 is defined by the section terminating equipment 38 and a regenerator 42.

Each of the network elements of the optical network 10 has performance monitoring responsibilities, and is provided with a performance monitor 44. The performance monitor 44 monitors the incoming digital stream, and the prevailing operating conditions of the network element itself. It communicates information to an operations system (OS), via the SONET network or using alternate channels of communication.

While an end-to-end connection is shown in FIG. 1, many alternate SONET network configurations are possible, as may be required by a particular network or application. For example, the embodiments shown herein can be operated equally well with a ring-based network architecture, and are operable with modern resilient packet ring networks.

Performance monitoring in accordance with the invention deals extensively with performance anomalies, defects, failures, and various indications generated in response thereto. It will be helpful to briefly discuss a selected group of such occurrences in a SONET network that are recognized as defects and failures, and result in various signals that may reach a performance monitor management system of the network. It will be understood that this selection is limited for purposes of brevity and clarity of illustration, and that the teachings herein may be routinely extended to encompass the larger universe of defects, failures, and indications that are generated in SONET networks that are compliant with the above-noted Telcordia publication GR-253-CORE, and in SONET networks generally.

In a network employing linear APS protection switching, each incoming SONET signal is separately monitored for several items that are required to be detected on the line level, both for purposes of protection switching and line performance monitoring. These items include line BIP errors, AIS-L, lower-layer LOS and SEF or LOF defects, RDI-L defects, and REI-L indications. The detection of certain of these items on an incoming signal may result in the generation of REI-L and RDI-L indications in the line overhead on the corresponding outgoing signal.

Figure 2:
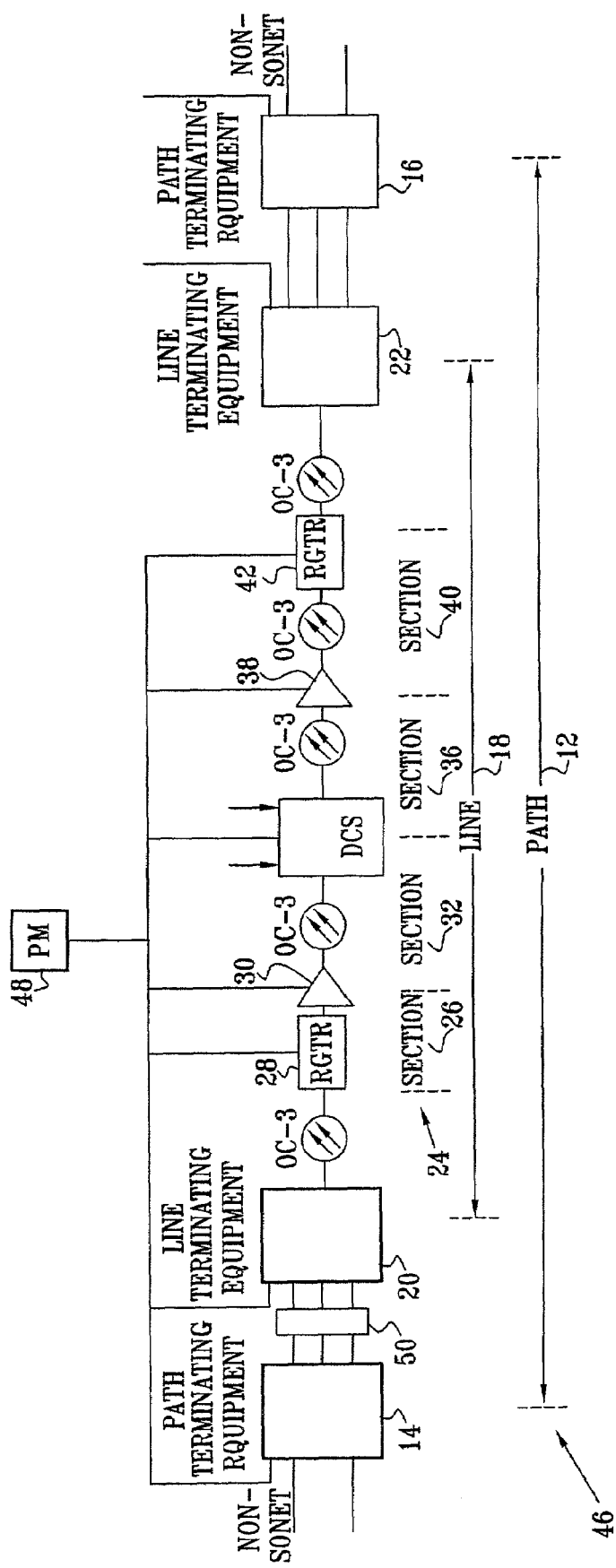
FIG. 2 is a block diagram of an end-to-end connection in a SONET network, which is constructed and operative in accordance with an alternate embodiment of the invention.

Reference is now made to FIG. 2, which is which is a high level diagram of an end-to-end connection in a SONET network, which is constructed and operative in accordance with an alternate embodiment of the invention. An optical network 46 is similar to the optical network 10, except now a single performance monitor 48 operates as a single state machine, routinely performing all performance monitoring tasks for all layers of the network, including the representative path layer network element 50. Elimination of separate machines for different network elements and different layers greatly simplifies the process of performance monitoring, and facilitates maintenance and modification of the performance monitor program.

Figure 3:
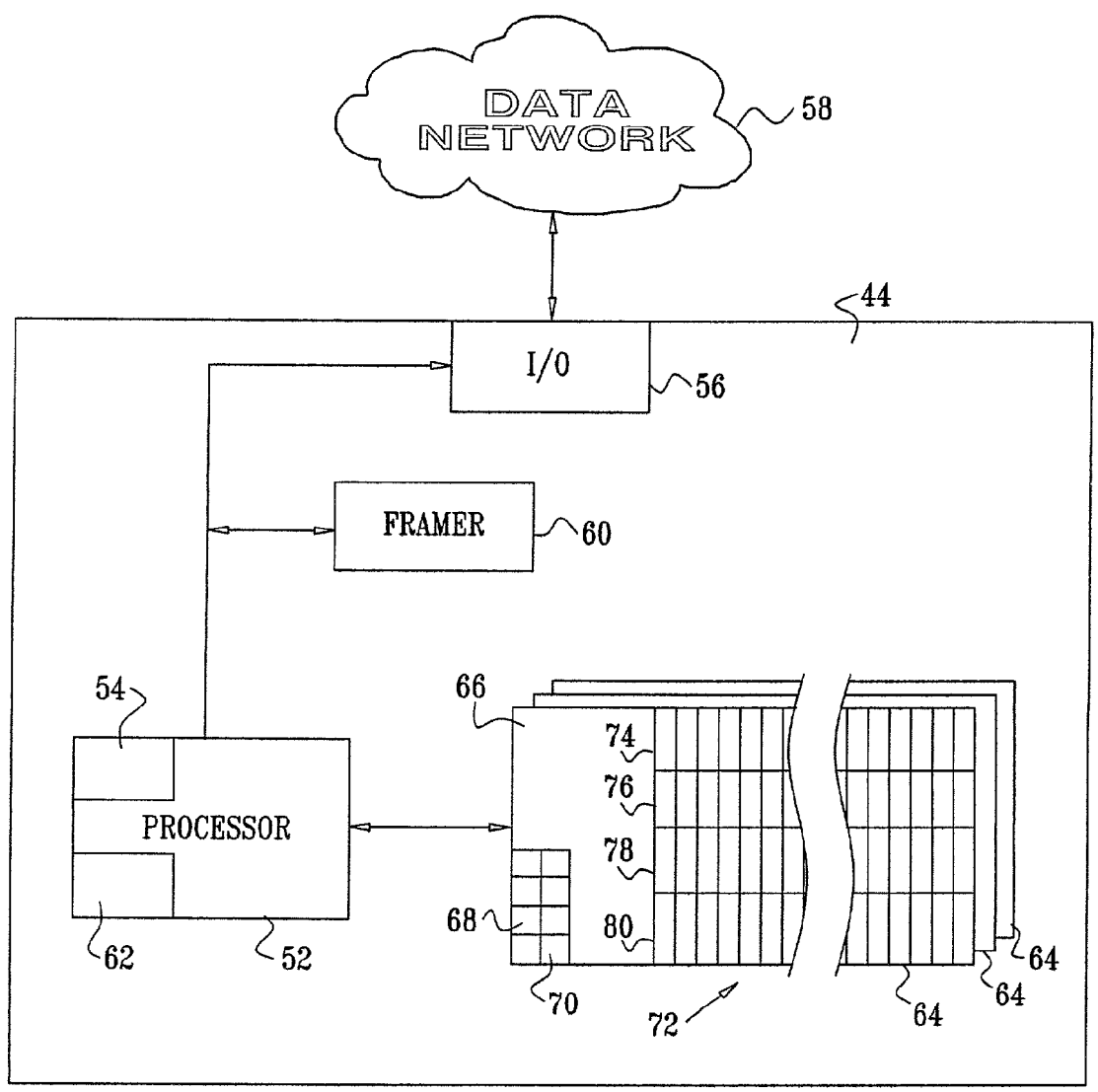
FIG. 3 is a detailed block diagram of a performance manager in the SONET network shown in FIG. 1.

Reference is now made to FIG. 3, which is a detailed block diagram of the performance monitor 44 shown in FIG. 1 in accordance with a preferred embodiment of the invention. The performance monitor 44 is provided with a processor 52, which can be realized as a general-purpose computer. In some embodiments, the processor 52 may be a multiprocessor, in which case the derivation of the various performance parameters discussed hereinbelow can be performed in parallel. In still other embodiments, the processor 52 may be shared with the network element associated with the performance monitor 44. The processor 52 is provided with conventional facilities as may be required for its operation, such as an execution memory 54, and it is able to access its associated network element in order to obtain internal operating parameters.

An I/O module 56 of the performance monitor 44 communicates with a data network 58, which may be SONET elements of the optical network 10 (FIG. 1), or may be an alternate network. In the latter case, performance management information can be available to an operator, even when the optical network 10 has failed entirely. In such circumstance, the performance monitor 44 and the data network 58 may provide information that is important to the restoration of network integrity.

A framer 60 is an independent processing element, which can be an integral part of the performance monitor 44 or can be located elsewhere in its associated network element. The framer 60 is programmed to inspect data frames of the digital stream. Upon detecting an event such as an alarm signal or other defect, the framer 60 generates an interrupt, which causes the processor 52 to store the detected event in an additional memory 62.

In some embodiments the processor 52 operates in a multitasking environment, and the framer 60 is realized by a concurrently executing process of the processor 52. In such embodiments the framer 60 may announce the presence of a recordable event by raising a software exception rather than by generating a hardware interrupt.

Information relating to each performance parameter is stored in one of a plurality of data storage memories 64. The memories 64 can be defined in one or more random access memories as are well known in the art. Each of the memories 64 has an assigned administrative area 66, in which is stored information associated with a particular performance parameter. This information includes an identifier of the performance parameter, identification of relevant counters, thresholds for the counters, and the collection method for each of the counters, e.g. accumulation of seconds, or a gauge value. As mentioned above, the first method is the most prevalent, while gauges are employed principally in the measurement of physical parameters of the photonic layer. Typically the identifiers for the counters are implemented as an array of pointers 68 that reference locations in the memory 62, in which storage for the counters themselves is allocated. The array of pointers 68 also includes references to other counters and registers, which are required during evaluation of performance parameters, for example ES, and SES, and counters related to tracking intervals in which resources of the optical network 10 are unavailable (UAS). The last category includes a UAS entry and UAS exit counter. The thresholds pertaining to the performance parameter are stored in an array 70.

Each of the memories 64 has a storage area 72 reserved for four data arrays, which are preferably defined as bitmaps. It is possible to define other data structures in the storage area 72, so long as they include a plurality of concatenated elements, each of which is can be independently marked or flagged during performance monitoring. Preferably, the data stricture can be evaluated by a logical operator in order to determine if any of the concatenated elements has been flagged. As used herein the term "flagging" means causing a memory state transition from a first binary state to a second binary state in one of the concatenated elements. It is an advantage of the present invention that binary logic relating to the presence or absence of SONET primitives can be employed in controls to improve the efficiency of performance monitoring, and that the evaluation of numerical counters is performed only if the flags of the storage area 72 are appropriately set or reset.

An OR-defects bitmap 74 has a plurality of locations, each of which relates to an individual SONET defect that is a control that permits calculation of the performance parameter specified in the administrative area 66. In some embodiments, SONET anomalies, which do not qualify as defects according to the above-noted Telcordia publication GR-253-CORE, can be included in the OR-defects bitmap 74. The OR-defects bitmap 74 is actually a bitmap of defects, such that if at least one defect exists, then the relevant performance parameter should be counted. During a monitoring interval, as is explained in further detail hereinbelow, as soon as one element of the OR-defects bitmap 74 has been set, it is not necessary to check any further as to other elements. The performance parameter is simply marked, and other performance monitoring tasks can be accomplished.

For example, when evaluating the performance parameter ES-S, the OR-defects bitmap 74 may be defined to include the defects LOS and SEF. Each STS frame includes a checksum field. The framer 60 monitors the checksum field, calculates the checksum of the current frame, and compares it with the checksum field. A code violation is registered if the two do not match. However, if during a performance monitoring interval, the defect LOS is active, then it is not necessary to the check the code violation counter (B1) of the STS frame, which is commonly used to indicate section errors in line-side signals. The SEF defect is registered if four consecutive framing errors are detected. In such a case, there is also no point in calculating the checksum on the received frames.

A NOT-defects bitmap 76 has a plurality of locations, each of which relates to an individual SONET anomaly or defect that is a control that prevents calculation of the performance parameter specified in the administrative area 66. An OR-failures bitmap 78 has a plurality of locations, each of which relates to an individual SONET failure that is a control that permits calculation of the performance parameter specified in the administrative area 66. The operation of the OR-failures bitmap 78 is the same as that of the OR-defects bitmap 74, except that SONET failures, rather than SONET defects form its elements. A NOT-failures bitmap 80 has a plurality of locations, each of which relates to an individual SONET failure that is a control that prevents calculation of the performance parameter specified in the administrative area 66. The bitmaps of the storage area 72 provide a highly compact representation of a large number of SONET performance primitives and permit the primitives to be efficiently related to performance parameters at all levels of the optical network 10 (FIG. 1). In addition, the bitmaps are amenable to highly efficient bitwise operations that are features of modern computer processors and are supported by programming languages such as C and C++.

The bitmaps of the storage area 72 may have fixed lengths, or may be individually dimensioned as appropriate to different performance parameters. In some cases, bitmap locations may be assigned based on derived functions of one or more performance primitives, even at different SONET levels, in order to deal with the complex interrelationships of performance data that are occur in practical SONET operations.

Operation.

The approach to performance monitoring for a performance parameter (PM) is outlined in Listing 1.

Listing 1

| Listing 1 |
| --- |
| DON'T-COUNT-DEFECTS (bitmap) - if one of these defects is active then don't calculate the PM.
DON'T-COUNT-ALARMS (bitmap) - if one of these alarms is active then don't calculate the PM.
COUNT-DEFECTS (bitmap) - if one of these defects is active then the PM should be incremented.
COUNT-ALARMS (bitmap) - if one of these alarms is active then the PM should be incremented.
Counter (optional)
   Evaluate Threshold for the counter.
   Counting method - Adding actual value or adding 1. |

Figure 4:
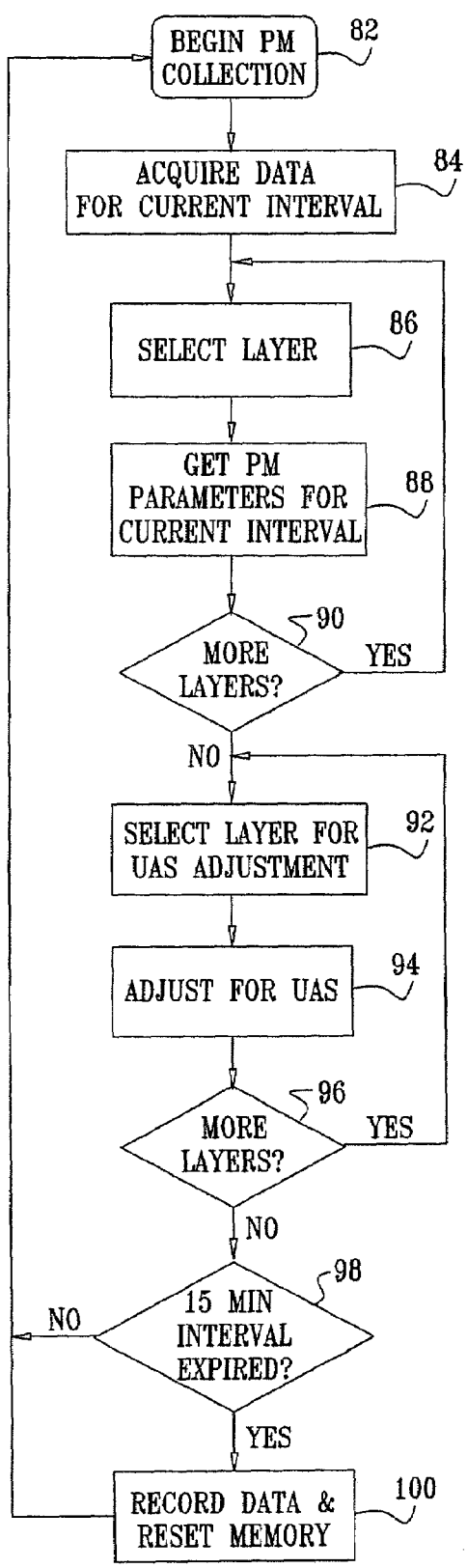
FIG. 4 is a high level flow chart illustrating a method of performance monitoring in a SONET network in accordance with a preferred embodiment of the invention.

Reference is now made to FIG. 4, which is a flow chart illustrating a method of performance monitoring in accordance with a preferred embodiment of the invention. The disclosure of FIG. 4 is described in conjunction with the operation of the apparatus of FIG. 3; however the method can also be performed in different apparatus.

At initial step 82 the performance monitor 44 begins collection of performance data. In practice initial step 82 recurs periodically, typically once each second under control of a task scheduler (not shown), In some embodiments an asynchronous collection message initiating initial step 82 may also be received from an external authority. Counters are initialized, including a UAS counter.

Next, at step 84 performance data is acquired via the I/O module 56 or directly from internal circuitry of the associated network element, and is stored by the processor 52, using the memory 62. During a one-second acquisition interval, the framer 60 inspects data frames, and under interrupt control, the processor 52 stores events of interest in the memory 62. Following expiration of the current acquisition interval, control proceeds to step 86, where values relating to performance parameters will be measured layer-by-layer.

At step 86 a layer is chosen. In the case of layers other than the photonic layer, various performance primitives, including anomalies, defects, and failures are identified and accumulated in counters, as appropriate for the particular network element that is associated with the performance monitor 44. When anomalies, defects, and failures are identified, appropriate counters in the memory 62 are incremented. In the case of the photonic layer, actual physical parameters may be stored, and counters indicating the violation of threshold values incremented.

All relevant performance parameters are established at step 88, which is explained in further detail hereinbelow with reference to FIG. 5. Control then passes to decision step 90.

At decision step 90, a determination is made whether more layers remain to be processed. If the determination at decision step 90 is affirmative, then control returns to step 86.

If the determination at decision step 90 is negative, then in the following steps, a specific adjustment for each layer is made for unavailability during the foregoing acquisition interval. Control proceeds to step 92, where a layer is selected. The process now continues at step 94.

In step 94 a negative adjustment is made for any unavailable seconds (UAS) that apply to the responsible performance monitor 44 (FIG. 1) that is associated with the layer that was selected in step 92. For example, in the case of the line layer, the unavailable seconds (UAS-L) parameter is a count of the seconds during which the line was considered to be unavailable. According to the above-noted Telcordia publication GR-253-CORE, a line becomes unavailable at the onset of 10 consecutive seconds that qualify as severely errored seconds for the line (SES-Ls), and continues to be unavailable until the onset of 10 consecutive seconds that do not qualify as SES-Ls. Similar adjustments are made for the other layers of the SONET network. Step 94 is explained in further detail hereinbelow with reference to FIG. 6. Control then passes to decision step 96.

At decision step 96 a determination is made whether more layers remain to be adjusted.

If the determination at decision step 96 is affirmative, then control returns to step 92.

If the determination at decision step 96 is negative, then at decision step 98 a test is made to determine if a 15-minute performance monitoring interval has expired. If the determination at decision step 98 is negative, then control returns to initial step 82. The granularity of performance monitoring is controlled by the length of the acquisition interval in step 84, as the update frequency of the performance parameters is only once each interval. Compliance with industry standards can be assured by controlling the length of the acquisition interval. For example, the above-noted Telcordia publication GR-253-CORE specifies measurement of errored seconds.

If the determination at decision step 98 is affirmative, then control proceeds to step 100. All totals for the current 15-minute performance monitoring interval are recorded in a database. All counters and bitmaps are reset. Control then returns to initial step 82.

Figure 5:
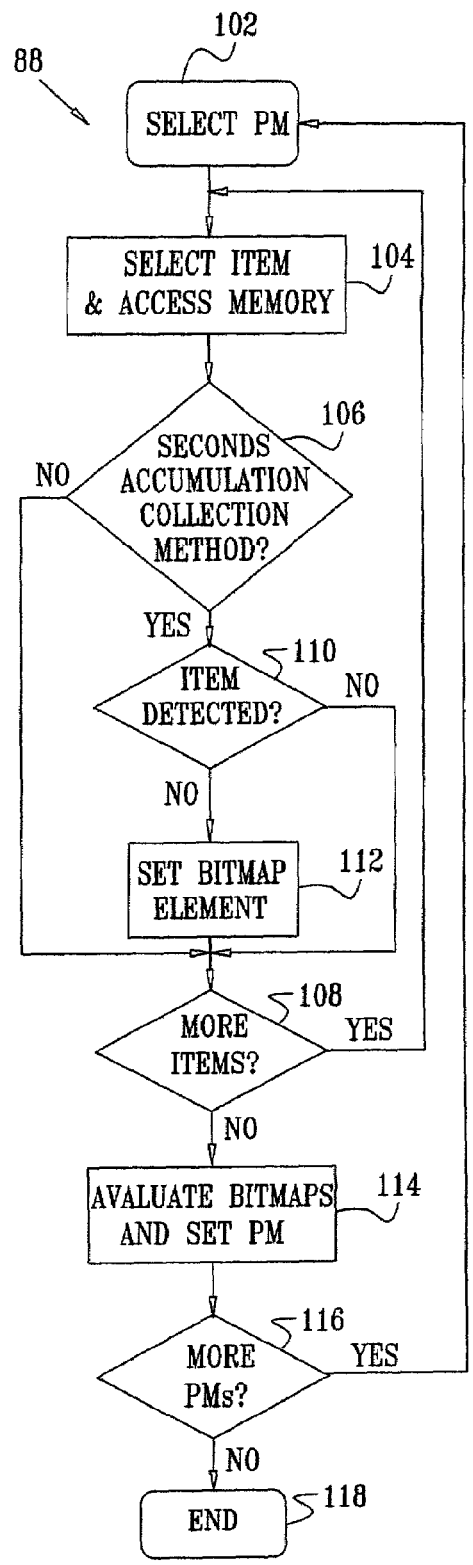
FIG. 5 is a detailed flow chart illustrating the derivation of performance parameters in the method shown in FIG. 4.

Reference is now made to FIG. 5, which is a detailed flow chart illustrating the establishment of performance parameters for the current acquisition interval in step 88 (FIG. 4). The procedure disclosed in FIG. 5 is performed at network elements of each section of each layer of the network. While many the steps in FIG. 5 are shown sequentially for clarity of presentation, in the preferred embodiments data is acquired only once. Many of the steps shown in FIG. 5 may be accomplished concurrently in different network elements, and even in the same network element, using an appropriate multiprocessing implementation. At initial step 102 a performance parameter is selected, and relevant details and specifications for the parameter are identified from the particular one of the memories 64 with which it is associated.

Next, at step 104 an item, e.g., a counter, relating to the current performance parameter is identified, and a location in the memory 62 relating to the item is accessed. Items of interest, including anomalies, defects, and failures are individually specified for each performance parameter. The values of counters relevant to the current performance parameter may also be obtained from the network element associated with the performance monitor 44.

At decision step 106 a determination is made whether the collection method associated with the item identified in step 104 is incrementation by a fixed value, e.g. 1. If the determination at decision step 106 is negative, then it is assumed that the method calls for the determination of a value, and control proceeds directly to decision step 108, which is disclosed below.

If the determination at decision step 106 is affirmative, then control proceeds to decision step 110, where a determination is made whether the item has been detected during the previous acquisition interval. If the determination at decision step 110 is negative, then control proceeds to decision step 108.

If the determination at decision step 110 is affirmative, then control proceeds to step 112, where the appropriate element of the four bitmaps in the storage area 72 (FIG. 1) is set. The bitmap element corresponding to the item that was detected in decision step 110 is preferably identified by a lookup table. Using a lookup table avoids the search penalty that would be incurred if the bitmaps were to be scanned to identify the correct bitmap element.

Next, at decision step 108 a determination is made whether more items remain to be evaluated for the current performance parameter. If the determination at decision step 108 is affirmative, then control returns to step 104.

If the determination at decision step 108 is negative, then control proceeds to step 114. Here the bitmaps, which were configured in step 112, are evaluated. Step 114 is explained in further detail hereinbelow.

Next, at decision step 116 a test is made to determine if more performance parameters remain to be evaluated. If the determination at decision step 116 is affirmative, then control returns to initial step 102.

If the determination at decision step 116 is negative, then control proceeds to final step 118, and the procedure terminates.

Figure 7:
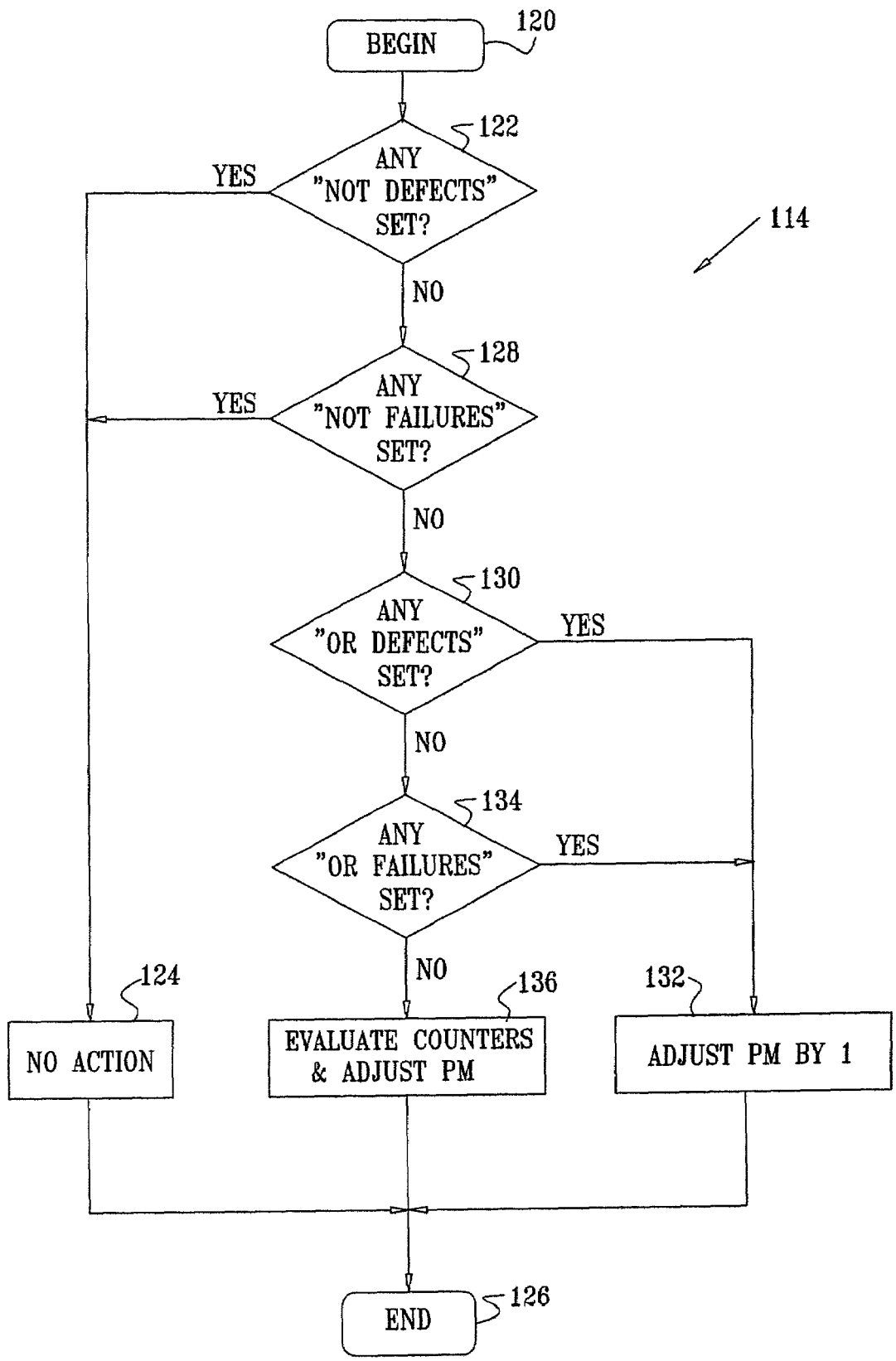
FIG. 7 is a detailed flow chart illustrating the evaluation of bitmaps in the method shown in FIG. 5.

Reference is now made to FIG. 7, which is a detailed flow chart illustrating the evaluation of the bitmaps in step 114 (FIG. 5). A general outline of the procedure disclosed with reference to FIG. 7 is shown in Listing 2, In Listing 2, the term "DEFECTS" refers to a global bitmap representing all defects that were active during the read interval; the term "FAILS" refers to a global bitmap representing all failures that were active during the read interval; and the term "COUNTERS" refers to a data structure holding all counters readings for the read interval.

Listing 2

```
If (any defect from NOT defects active on DEFECTS)
    then QUIT.
If (any fail from NOT failures active on FAILS)
    then QUIT.
If (any defect from OR defects active on DEFECTS)
    then Return 1 (add second)
If (any fail from OR failures active on FAILS)
    then Return 1 (add second).
Get the relevant counter value from COUNTERS and if the
    value is above threshold then
        If counting method is actual value, return
        (actual value)
        Else, return 1 (increment by 1 second)
```

The process begins at initial step 120, and control immediately proceeds to decision step 122, where the NOT-defects bitmap 76 (FIG. 1) is tested. If at decision step 122 any element of the NOT-defects bitmap 76 is determined to have been set during the foregoing acquisition interval, a defect has been detected which prevents the calculation of the performance parameter for the foregoing acquisition interval. Control proceeds to step 124.

At step 124, the current performance parameter is marked as being ineligible for evaluation during the foregoing acquisition interval. Control then proceeds directly to final step 126.

If it is determined at decision step 122 that no elements of the NOT-defects bitmap 76 are set, then control proceeds to decision step 128 where the NOT-failures bitmap 80 (FIG. 1) is tested.

If at decision step 128 any element of the NOT-failures bitmap 80 is determined to have been set during the foregoing acquisition interval, then a failure has been detected which prevents the calculation of the current performance parameter for the foregoing acquisition interval. Control proceeds to step 124.

If it is determined at decision step 128 that no elements of the NOT-failures bitmap 80 are set, then control proceeds to decision step 130, where the OR-defects bitmap 74 (FIG. 1 is tested.

If at decision step 130 any element of the OR-defects bitmap 74 is determined to have been set during the foregoing acquisition interval, then a defect has been detected that requires adjustment of the current performance parameter. Control proceeds to step 132, where the current performance parameter is adjusted by a predetermined value, typically one second. Control then proceeds to final step 126.

If it is determined at decision step 130 that no elements of the OR-defects bitmap 74 are set, then control proceeds to decision step 134, where the OR-failures bitmap 78 (FIG. 1) is tested.

If at decision step 134 any element of the OR-failures bitmap 78 is determined to have been set during the foregoing acquisition interval, then a failure has been detected, which requires adjustment of the current performance parameter by a predetermined value. Control proceeds to step 132.

If it is determined at decision step 134 that no elements of the OR-failures bitmap 78 are set, then control proceeds to step 136, where counters associated with the current performance parameter are evaluated. Step 136 is explained in further detail hereinbelow. After performance of step 136 the process terminates at final step 126.

In some embodiments the bitmaps discussed above with reference to FIG. 7 can be evaluated in parallel.

Reference is now made to FIG. 8, which is a detailed flow chart illustrating the evaluation of the counters in step 136 (FIG. 7).

The process begins at initial step 138. The value of the counter associated with the current performance parameter is recalled. The counter is referenced by an element of the array of pointers 68 (FIG. 1) of the particular one of the memories 64 that is associated with the current performance parameter.

Control then proceeds to decision step 140, where a test is made to determine whether the value of the counter that was recalled in initial step 138 exceeds the threshold that is stored in the array 70 (FIG. 1). If the determination at decision step 140 is negative, then no positive adjustment of the counter is made. Control proceeds to final step 142.

If the determination at decision step 140 is affirmative, then control proceeds to decision step 144, where it is determined whether the performance parameter is to be adjusted by adding the value of the counter recalled in initial step 138. It will be recalled that for each performance parameter it is specified whether to increment the parameter by the actual value returned, or to increment the parameter by 1.

If the determination at decision step 144 is affirmative, then control proceeds to step 146, where the current performance parameter is positively adjusted by the value of the counter. Control then proceeds to final step 142.

If the determination at decision step 144 is negative, then control proceeds to step 148, where the current performance parameter is positively adjusted by the value 1. Control proceeds to final step 142.

Figure 6:
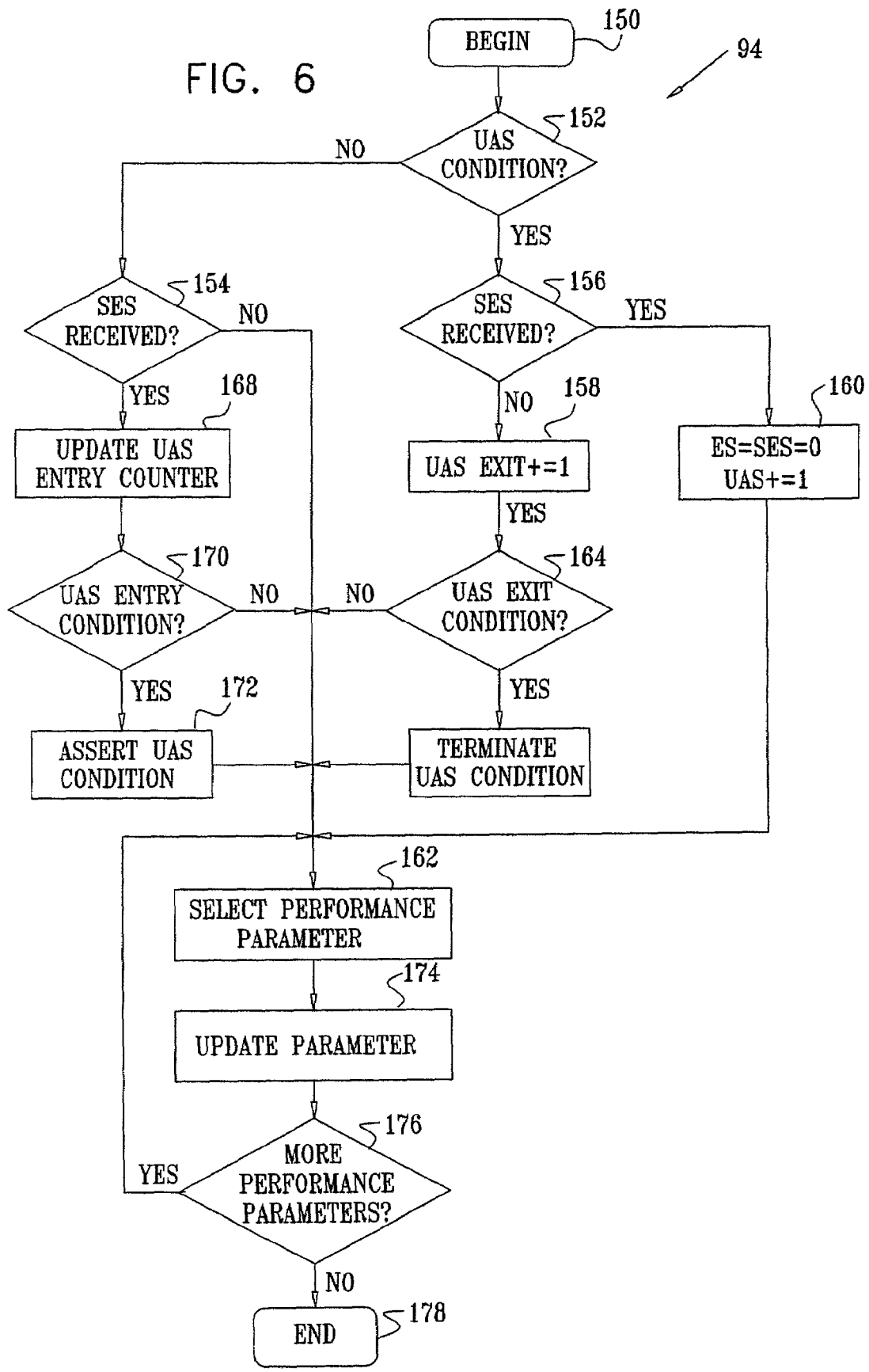
FIG. 6 is a detailed flow chart illustrating adjustment of a current performance parameter for unavailable seconds.

Reference is now made to FIG. 6, which is a detailed flow chart illustrating adjustment of the current performance parameter for unavailable seconds (UAS) in step 94 (FIG. 4). An outline of the procedure that is disclosed with reference to FIG. 6 is shown in Listing 3.

A UAS condition is declared when SES conditions have been in effect for more than 10 consecutive seconds. At the time of this declaration, a UAS counter is initialized to a value of 10, and then counts continually, so long as UAS condition apply. A corresponding downward adjustment of the SES and ES counters is also made. The UAS condition is declared to be terminated after 10 consecutive seconds have elapsed with no SES conditions active. At that time the UAS counter is adjusted downward by 10, and corresponding forward adjustments are made for the ES and SES counters. To assist in these determinations, a UAS entry counter and a UAS exit counter respectively count consecutive frames, in which SES defects are active and not active.

Listing 3

```
Update UAS ( )
{
    if UAS condition applies (more then 10 sec of SES)
    {
        if SES condition apply
```

-continued

Listing 3

```
            // state 1 : inside UAS, received SES
            1. Ignore previous ES and SES values (zero)
            2. Increment UAS value by 1.
        else
            // state 2 : inside UAS, didn't receive SES
            1. Advance UAS exit counter.
            2. If UAS exit conditions apply (more then 10
            sec without SES)
                Do UAS exit PM adjustments:
                    2.1 subtract 9 from UAS value.
                    2.2 Update ES with counted ES events
    }
    else
    {
        if SES condition apply
            // state 3 : not in UAS, received SES
            1. Advance UAS enter counter
            2. If UAS enter conditions apply (more then 10
            sec with SES)
                Do UAS enter PM adjustments:
                    2.1 sub 9 from ES & SES value.
                    2.2 Add 10 to UAS.
        else
            // state 4 : not in UAS, didn't receive SES
            Do nothing
    }
}
```

The procedure begins at initial step 150. Control immediately passes to decision step 152, where it is determined if UAS conditions are in effect. If the determination at decision step 152 is negative, then control proceeds to decision step 154, which is disclosed below.

If the determination at decision step 152 is affirmative, it is necessary to evaluate one of two possibilities, depending on whether an SES condition occurred during the foregoing acquisition interval. Control proceeds to decision step 156, where a test is made to determine whether SES have been reported during the foregoing acquisition interval. If the determination at decision step 156 is negative, then control proceeds to step 158, which is disclosed below.

If the determination at decision step 156 is affirmative, then control proceeds to step 160. Any prior ES and SES information is caused to be ignored. Typically this is done by resetting the ES and SES counters that are referenced in the array of pointers 68 (FIG. 1). A UAS counter is incremented by one. Control then is transferred to step 162, which is explained below. It will be recalled that the UAS counter was initialized at the beginning of the current read interval.

Step 158 is performed if the decision at decision step 156 indicated that SES conditions do not currently apply. A UAS exit counter is referenced and advanced, using the array of pointers 68 (FIG. 1). Control then proceeds to decision step 164.

At decision step 164 a test is made to determine if UAS exit conditions apply. This test produces an affirmative result if more than 10 consecutive seconds have elapsed without any SES being reported. If the determination at decision step 164 is negative, then control proceeds to step 162.

If the determination at decision step 164 is affirmative, then control proceeds to step 166, where UAS conditions are declared to be terminated. UAS exit adjustments are made. The UAS counter is decremented by nine, and the ES counter is updated according to ES events that were reported during the foregoing acquisition interval. Control then proceeds to step 162.

Decision step 154 is performed if the determination at decision step 152 was negative, indicating that UAS conditions are not in effect. The test, which is the same as that performed in decision step 156, is performed in order to determine whether SES have been reported during the foregoing acquisition interval. If the determination at decision step 154 is negative, then no further action is taken, and control proceeds to step 162.

If the determination at decision step 154 is affirmative, then control proceeds to step 168, where a UAS entry counter is advanced. Control then proceeds to decision step 170.

At decision step 170 a determination is made whether UAS entry conditions apply. This test succeeds if SES conditions have been in effect for at least 10 consecutive seconds. A UAS entry counter is tested to determine if its value is at least 10. If the determination at decision step 170 is negative, then Control proceeds to step 162.

If the determination at decision step 170 is affirmative, then control proceeds to step 172, where a UAS condition is declared to be in effect. Adjustments to the performance parameter counters are made The ES and SES counters are each decremented by nine. The UAS counter is incremented by 10. These counters are typically referenced using the array of pointers 68 (FIG. 1). Control proceeds to step 162.

At step 162 a performance parameter is chosen among the performance parameters that qualify for adjustment for the current network layer, which was chosen in step 92 (FIG. 4).

Next, at step 174 the performance parameter that was chosen in step 162 is adjusted according to the current value of the UAS counter. The details for adjusting particular SONET performance parameters are given in the above-noted Telcordia publication GR-253-CORE. In many cases they are treated in the same manner as the SES and ES parameters, as disclosed above.

At decision step 176 a determination is made whether more performance parameters need to be adjusted. If the determination at decision step 176 is affirmative, then control returns to step 162.

If the determination at decision step 176 is negative, then control proceeds to final step 178. The process then terminates.

EXAMPLE

The following example illustrates performance monitoring of using the far-end line layer performance parameter ES-LFE. The ES-LFE parameter is a count of seconds, during which, at any point during a second, at least one line BIP error was reported by the far-end line terminating equipment, using the REI-L indication, or presence of an RDI-L defect. This example is explained with reference to FIG. 1 and FIG. 3. One of the memories 64 is assigned to the performance parameter ES-LFE, and its bitmaps are configured as follows.

An element of the OR-defects bitmap 74 is associated with the defect RDI-L.

Elements of the NOT-defects bitmap 76 are associated with the defects LOS, LOF, and AIS-L.

No failures are associated with the OR-failures bitmap 78.

No failures are associated with the NOT-failures bitmap 80.

The related counter is linked to the line BIP errors using an element of the array of pointers 68. These errors are detected in the B2 byte of the STS-N SPE.

The counter threshold in the array 70 is assigned the value 9835, which is appropriate for OC-192 rates.

Monitoring is then conducted in accordance with the procedure disclosed above with reference to FIG. 4.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art which would occur to persons skilled in the art upon reading the foregoing description.

The invention claimed is:

1. A method of monitoring performance of a communications network, comprising the steps of:
    associating a performance parameter with a set of events in said communications network;
    defining a map in a memory, wherein said map comprises a plurality of concatenated elements, each of said concatenated elements being independently capable of a transition between a first binary state and a second binary state, each of said concatenated elements corresponding to a member of said set of said events;
    monitoring said communications network for an acquisition interval, by the steps of:
        detecting a signal in a data stream of said communications network that represents an occurrence of one of said events during said acquisition interval; and
        thereafter flagging one of said concatenated elements of said map that corresponds to said one of said events; and
    following performance of said step of monitoring calculating said performance parameter in accordance with a state of said map.

2. The method according to claim 1, wherein said communications network is a SONET network.

3. The method according to claim 1, wherein said communications network is an SDH network.

4. The method according to claim 1, wherein said map comprises a plurality of maps, and said step of associating said performance parameter comprises the steps of:
    associating members of a first subset of said set with said concatenated elements of a first map of said plurality of maps; and
    associating members of a second subset of said set with said concatenated elements of a second map of said plurality of maps; and
    wherein said step of calculating said performance parameter is performed if at least one of said concatenated elements of said first map is flagged.

5. The method according to claim 4, wherein said step of calculating said performance parameter is performed if none of said concatenated elements of said second map is flagged.

6. The method according to claim 1, wherein said map is a bitmap.

7. The method according to claim 1, wherein said step of calculating further comprises the step of adjusting said performance parameter for a portion of said acquisition interval during which said data stream was determined to be unavailable.

8. The method according to claim 1, wherein said step of detecting said signal further comprises monitoring a network element of said communications network.

9. A method of monitoring performance of an optical communications network, comprising the steps of:
    associating a performance parameter with a set comprising defects and failures capable of occurring in said optical communications network;

defining a map in a memory, wherein said map comprises a plurality of concatenated elements, each of said concatenated elements being independently capable of a transition between a first binary state and a second binary state, each of said concatenated elements corresponding to a member of said set;

monitoring said optical communications network for an acquisition interval, by the steps of:

detecting information in a frame that is transmitted in a data stream of said optical communications network that represents an occurrence of one of said defects and failures during said acquisition interval;

thereafter flagging one of said concatenated elements of said map that corresponds to said one of said defects and failures; and following performance of said step of monitoring calculating said performance parameter in accordance with a state of said map.

10. The method according to claim 9, wherein said optical communications network is a SONET network.

11. The method according to claim 9, wherein said optical communications network is an SDH network.

12. The method according to claim 9, wherein said step of defining said map is performed by:

defining an OR-defects bitmap and associating elements thereof with first members of said set, said first members being defects;

defining a NOT-defects bitmap and associating elements thereof with second members of said set, said second members being defects;

defining an OR-failures bitmap and associating elements thereof with third members of said set, said third members being failures;

defining a NOT-failures bitmap and associating elements thereof with fourth members of said set, said fourth members being failures; and said step of flagging is performed by changing one of said first binary state and said second binary state to another of said first binary state and said second binary state in one of said concatenated elements of one of said OR-defects bitmap, said NOT-defects bitmap, said OR-failures bitmap and said NOT-failures bitmap.

13. The method according to claim 12, wherein said step of calculating is performed if said step of flagging was performed in one of said OR-defects bitmap and said OR-failures bitmap.

14. The method according to claim 12, wherein said step of calculating is performed if said step of flagging was not performed in one of said NOT-defects bitmap and said NOT-failures bitmap.

15. The method according to claim 9, wherein said step of calculating further comprises the step of adjusting said performance parameter for a portion of said acquisition interval during which said data stream was determined to be unavailable.

16. The method according to claim 9, wherein said step of monitoring further comprises monitoring a network element of said optical communications network.

17. An apparatus for monitoring performance of a communications network, comprising:

a memory having a map defined therein, wherein said map comprises a plurality of concatenated elements, each of said concatenated elements being independently capable of a transition between a first binary state and a second binary state;

a processor accessing said memory and being connected to a network element of said communications network, program instructions being stored in said processor, which instructions cause said processor to perform the steps of:

associating a performance parameter with a set of events in said communications network, each of said concatenated elements of said map corresponding to a member of said set of said events;

monitoring said communications network for an acquisition interval, by the steps of:

detecting a signal in a data stream of said communications network that represents an occurrence of one of said events during said acquisition interval;

flagging in one of said concatenated elements an indication that said occurrence has been detected; and following performance of said step of monitoring calculating said performance parameter in accordance with a state of said map.

18. The apparatus according to claim 17, wherein said communications network is a SONET network.

19. The apparatus according to claim 17, wherein said communications network is a SDH network.

20. The apparatus according to claim 17, wherein said memory comprises a plurality of maps, and said instructions cause said processor to perform said step of associating each said member by performing the steps of:

associating members of a first subset of said set with said concatenated elements of a first map of said plurality of maps; and associating members of a second subset of said set with said concatenated elements of a second map of said plurality of maps; and wherein said step of calculating said performance parameter is performed if at least one of said concatenated elements of said first map has said indication recorded therein.

21. The apparatus according to claim 20, wherein said instructions cause said processor to perform said step of calculating said performance parameter if none of said concatenated elements of said second map has said indication recorded therein.

22. The apparatus according to claim 17, wherein said map is a bitmap.

23. The apparatus according to claim 17, wherein said instructions further cause said processor to perform said step of calculating by adjusting said performance parameter for a portion of said acquisition interval during which said data stream was determined to be unavailable.

24. The apparatus according to claim 17, wherein said instructions further cause said processor to perform said step of detecting said signal by monitoring an operating condition of said network element.

25. The apparatus according to claim 17, wherein said network element comprises a plurality of network elements disposed in a plurality of different layers of said communications network.

26. An apparatus for monitoring performance of an optical communications network, comprising:

a memory having a bitmap defined therein;

a processor accessing said memory and being connected to a network element of said optical communications network, program instructions being stored in said processor, which instructions cause said processor to perform the steps of:

associating a performance parameter with a set comprising defects and failures capable of occurring in said optical communications network;

monitoring said optical communications network for an acquisition interval, by the steps of:
  detecting information in a frame that is transmitted in a data stream of said optical communications network that represents an occurrence of one of said defects and failures during said acquisition interval;
  flagging in said bitmap an indication that said occurrence has been detected; and
following performance of said step of monitoring calculating said performance parameter responsive to a state of said bitmap.

27. The apparatus according to claim 26, wherein said optical communications network is a SONET network.

28. The apparatus according to claim 26, wherein said optical communications network is a SDH network.

29. The apparatus according to claim 26, wherein said bitmap comprises:
  an OR-defects bitmap and associating elements thereof with first members of said set, said first members being defects;
  a NOT-defects bitmap and associating elements thereof with second members of said set, said second members being defects;
  an OR-failures bitmap and associating elements thereof with third members of said set, said third members being failures;
  a NOT-failures bitmap and associating elements thereof with fourth members of said set, said fourth members being failures.

30. The apparatus according to claim 29, wherein said instructions cause said processor to perform said step of calculating if said indication is memorized in one of said OR-defects bitmap and said OR-failures bitmap.

31. The apparatus according to claim 29, wherein said instructions cause said processor to perform said step of calculating if said indication is not memorized in one of said NOT-defects bitmap and said NOT-failures bitmap.

32. The apparatus according to claim 26, wherein said instructions further cause said processor to perform said step of calculating further by adjusting said performance parameter for a portion of said acquisition interval during which said data stream was determined to be unavailable.

33. The apparatus according to claim 26, wherein said instructions further cause said processor to perform said step of monitoring by monitoring an operating condition of said network element.

34. The apparatus according to claim 26, wherein said network element comprises a plurality of network elements disposed in a plurality of different layers of said optical communications network.

35. A computer software product, comprising a computer-readable medium in which computer program instructions are stored, which instructions, when read by a computer, cause the computer to monitor performance of a communications network, by performing the steps of:
  associating a performance parameter with a set of events in said communications network;
  monitoring said communications network for an acquisition interval, by the steps of:
    detecting a signal in a data stream of said communications network that represents an occurrence of a member of said set of said events during said acquisition interval;
    flagging in a bitmap an indication that said occurrence has been detected by associating each member of said set of said events with an element of said bitmap; and
  following performance of said step of monitoring calculating said performance parameter in accordance with a state of said bitmap.

36. The computer software product according to claim 35, wherein said bitmap comprises a plurality of bitmaps, and said instructions cause the computer to perform said step of associating each said member by the steps of:
  associating members of a first subset of said set with elements of a first bitmap of said plurality of bitmaps; and
  associating members of a second subset of said set with elements of a second bitmap of said plurality of bitmaps; and
  wherein said step of calculating said performance parameter is performed if at least one element of said first bitmap has said indication recorded therein.

37. The computer software product according to claim 36, wherein said instructions cause the computer to perform said step of calculating said performance parameter if no element of said second bitmap has said indication recorded therein.

38. The computer software product according to claim 35, wherein said instructions further cause the computer to perform said step of calculating by adjusting said performance parameter for a portion of said acquisition interval during which said data stream was determined to be unavailable.

39. The computer software product according to claim 35, wherein said instructions further cause the computer to perform said step of detecting said signal by monitoring a network element of said communications network.

40. A computer software product, comprising a computer-readable medium in which computer program instructions are stored, which instructions, when read by a computer, cause the computer to monitor performance of an optical communications network, comprising the steps of:
  associating a performance parameter with a set comprising defects and failures capable of occurring in said optical communications network;
  monitoring said optical communications network for an acquisition interval, by the steps of:
    detecting information in a frame that is transmitted in a data stream of said optical communications network that represents an occurrence of a member of said set during said acquisition interval;
    flagging an indication in a memory map that said occurrence has been detected, wherein said map comprises a plurality of concatenated elements, each of said concatenated elements being independently capable of a transition between a first binary state and a second binary state, each of said concatenated elements corresponding to one of said defects and failures;
  following performance of said step of monitoring calculating said performance parameter responsive to said indication.

41. The computer software product according to claim 40, wherein, said optical communications network is a SONET network.

42. The computer software product according to claim 40, wherein, said optical communications network is an SDH network.

43. The computer software product according to claim 40, wherein said instructions cause the computer to perform said step of flagging is performed by:
  defining an OR-defects bitmap and associating elements thereof with first members of said set, said first members being defects;

defining a NOT-defects bitmap and associating elements thereof with second members of said set, said second members being defects;

defining an OR-failures bitmap and associating elements thereof with third members of said set, said third members being failures;

defining a NOT-failures bitmap and associating elements thereof with fourth members of said set, said fourth members being failures; and memorizing said indication in an element of one of said OR-defects bitmap, said NOT-defects bitmap, said OR-failures bitmap and said NOT-failures bitmap.

44. The computer software product according to claim 43, wherein said instructions cause the computer to perform said step of calculating if said indication is memorized in one of said OR-defects bitmap and said OR-failures bitmap.

45. The computer software product according to claim 43, wherein said instructions cause the computer to perform said step of calculating if said indication is not memorized in one of said NOT-defects bitmap and said NOT-failures bitmap.

46. The computer software product according to claim 40, wherein said instructions further cause the computer to perform said step of calculating by adjusting said performance parameter for a portion of said acquisition interval during which said data stream was determined to be unavailable.

47. The computer software product according to claim 40, wherein said instructions cause the computer to perform said step of monitoring by monitoring a network element of said optical communications network.

* * * * *